Jan. 17, 1967  D. PFEILSCHIFTER  3,298,494
DEVICE FOR PICKING UP AND UNLOADING POURABLE MATERIAL
Filed Oct. 19, 1965  2 Sheets-Sheet 1

Inventor:
Dieter Pfeilschifter
By

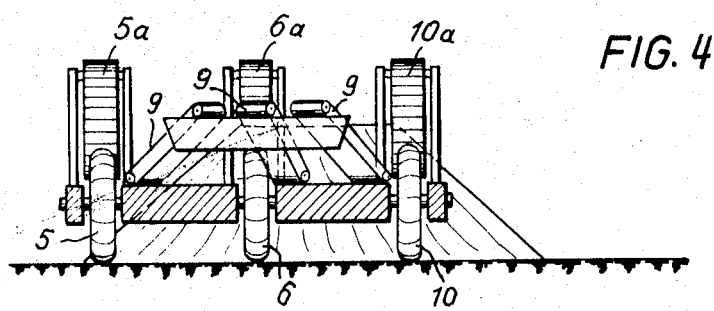
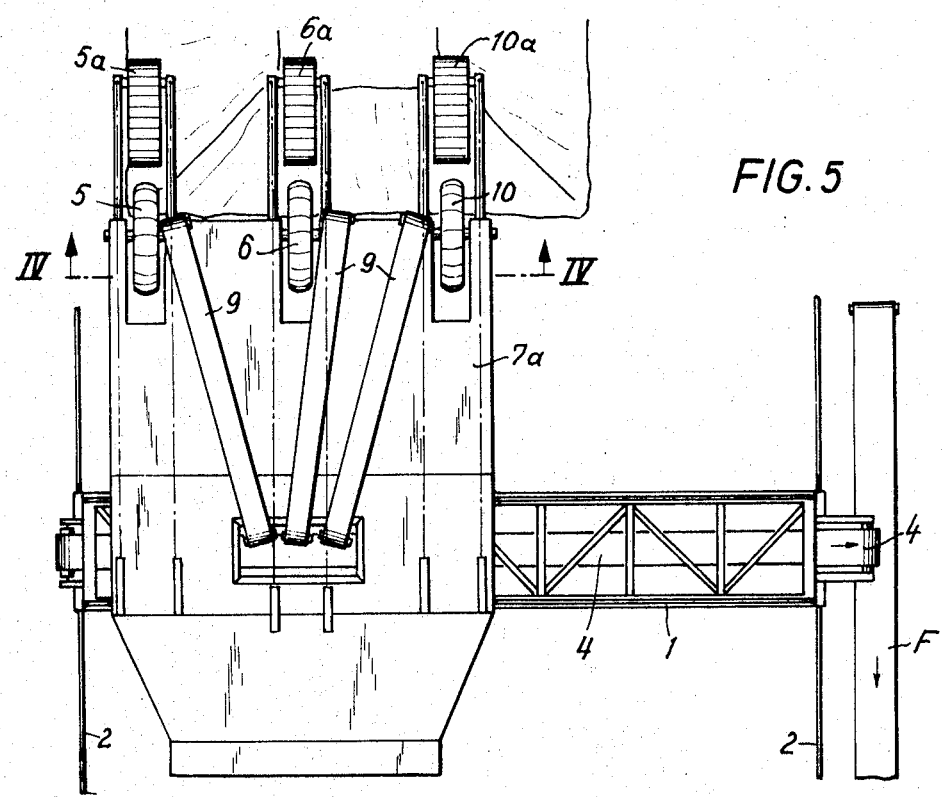

३,२९८,४९४
DEVICE FOR PICKING UP AND UNLOADING POURABLE MATERIAL
Dieter Pfeilschifter, Rheinberg, Germany, assignor to Beteiligungs- und Patentverwaltungsgesellschaft mit beschränkter Haftung, Essen, Germany
Filed Oct. 19, 1965, Ser. No. 497,668
Claims priority, application Germany, Nov. 11, 1964, B 79,281
5 Claims. (Cl. 198—9)

The present invention relates to a device for removing or taking down material from a pile of pourable material on a storage place.

Heretofore known devices of the type involved usually comprise a conveyor in the form of a bridge which extends along that slope of the pile to be removed from which the material is being taken down. This conveyor bridge is movable on rails at opposite sides of the pile so that it is movable toward and away from the pile. Such a device is preferably provided with a bucket wheel and is movable over the conveyor bridge and is adapted to release the picked up material onto the conveyor supported by the bridge. This conveyor then conveys the picked up material to other conveying means. Devices of this type yield a good intermixture of the material picked up from the storage place.

It is furthermore known to equip devices of the above mentioned type with two bucket wheels spaced from each other by a non-variable distance which equals half the width of the pile of pourable material at the base of the slope of said pile. Both bucket wheels are together movable on the bridge carrying the belt conveyor. An arrangement with two bucket wheels is desirable when the profile of the slope of the pile to be removed forms an isosceles triangle. In this instance, with each position of the bucket wheels on the bridge, the sum of the quantities of material simultaneously picked up by the bucket wheels will remain the same. However, such an arrangement does not yield a uniform load on the conveyor belt on the bridge. This is due to the fact that when looking in the conveying direction of said conveyor belt, one bucket wheel will be located ahead of the other bucket wheel by a certain distance, and the material unloaded by the first bucket wheel onto the conveyor belt has to move through said distance before it combines with the material unloaded onto said conveyor belt by the other bucket wheel. Due to the thus caused delay, it will be appreciated that the quantities being mixed on the conveyor belt are quantities of goods which were picked up from the pile at different times. Therefore, the total quantity of goods unloaded onto the conveyor belt at one and the same time will when the bucket wheels move in the same direction as the convying section of said conveyor belt be less than will be the case when the bucket wheels move in the opposite direction on the bridge.

This drawback could be overcome when the two bucket wheels in contrast to the heretofore known arrangement do not surround the support for the conveyor belt but are mounted on booms while the distance between said bucket wheels and the conveyor belt is bridged by feeding conveyors on said booms. In this instance it would be necessary to drive the conveyor belts at different speeds so that the material picked up by the two bucket wheels at one and the same time will after the same time interval meet on the conveyor belt. However, with such an arrangement it would be necessary that the velocities of the two feeding conveyors or at least the velocity of one of said feeding conveyors be changed each time when the bucket wheels reverse their direction of movement on the bridge girder. This is, of course, disadvantageous in view of the required control device.

Different velocities of the feeding conveyors could also be obtained when the material picked up by the bucket wheels were transported not only by means of a conveyor belt in a direction perpendicular to the bridge support but subsequently also through the intervention of a second feeder belt extending along said bridge support and were moved to an area where the feeding conveyor of the other bucket wheel unloads its picked up material onto the bridge conveyor belt. While in this instance it would not be necessary to change the velocities of the feeding conveyors when reversing the direction of the two bucket wheels, it would however be necessary to put up with the drawback that at least an additional drive for the second feeding conveyor following the first bucket wheel would be required.

Generally, the employment of different velocities for the conveyor belts is disadvantageous because a high belt velocity has associated therewith a small conveyor belt cross section of the belt whereas a slow belt velocity has associated therewith a large conveyor belt cross section. Thus, different conveyor belts would be required and, accordingly, different mountings therefor which in turn would complicate the stocking of the corresponding parts.

It would be possible to operate the feeding conveyors following the two bucket wheels at one and the same velocity if these feeding conveyors or conveyor belts which have the same conveying length were followed by two further feeding conveyors or conveyor belts extending from the first feeding conveyors with the same conveying length to a common transfer station in the middle between the two first mentioned feeding conveyors. However, also such an arrangement would be disadvantageous because two additional feeding belts with corresponding transfer stations and driving units would be required.

It is, therefore, an object of the present invention to provide an arrangement for removing material from a pile of pourable material on a storage place, which will overcome the above-mentioned drawbacks.

It is another object of this invention to provide a device as set forth above, which may have more than two bucket wheels while assuring a satisfactory mixture of the picked up material on the conveyor belt carried by the bridge member.

These and other objects and advantages of the invention will appear more clearly from the following specification in connection with the accompanying drawings, in which:

FIG. 1 diagrammatically illustrates a view of a device according to the present invention arranged in front of a pile of pourable material to be removed by the device.

FIGS. 4 and 5 illustrate a modified device according to the present invention with three bucket wheels, FIG. 4 being a section along the line IV—IV of FIG. 5 and FIG. 5 being a top view of FIG. 4.

Figure 1:
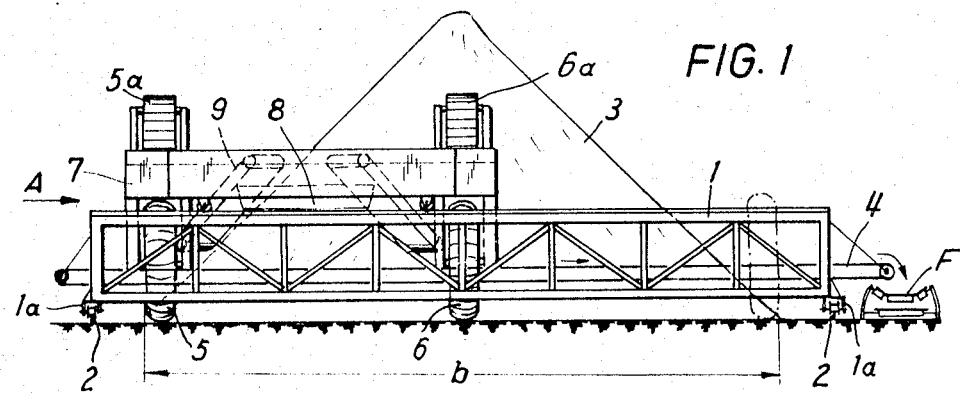

The device for picking up and unloading pourable material from a pile of pourable material according to the present invention, which includes girder means, first conveyor means extending in the longitudinal direction of said girder means and being supported by said girder means which latter is supported by carriage means operable to move said girder means with said conveyor means in a direction transverse to the longitudinal direction of said girder means toward and away from a pile of pourable material to be picked up, is characterized primarily in that the pick up means carried by a boom supported by the girder means and movable in the longitudinal direction of said girder means have associated therewith a plurality of feeder belts of substantially the same feeding length which are arranged in V-formation with regard to each other so as to converge at a common transfer station which together with the pick up means moves on the girder means.

More specifically, referring to the drawings, the arrangement shown therein comprises a bridge member or girder 1 which is movable along the base of the pile of pourable material to be picked up. Said girder rests on carriages 1a which are movable on rails 2 extending on opposite sides of the pile to be removed and in a direction substantially perpendicular to the longitudinal direction of girder 1. Supported by and arranged in the interior of the girder 1 is a conveyor belt 4 adapted to convey the picked up material in the direction of the arrow B and to unload the material received thereby onto a removing conveyor F.

For purposes of picking up material from the pile 3 of pourable goods, there are provided two bucket wheels 5 and 6 which are carried by a cantilever structure or boom 7 which is movably mounted on girder 1 so as to move in the longitudinal direction of the latter. Advantageously, bucket wheels 5 and 6 are respectively preceded by scrapers 5a and 6a likewise supported by boom 7 for scraping the pile of pourable goods so as to feed the loosened material to the respective adjacent bucket wheels. The distance a between the bucket wheels 5 and 6 preferably equals half the width b of pile 3 at the bottom of the slope from which the material is being removed. Boom 7 has an opening or transfer station 8 above conveyor belt 4 arranged in such a way that said transfer station will remain above conveyor belt 4 in any position of boom 7 on girder 1.

Figure 2:
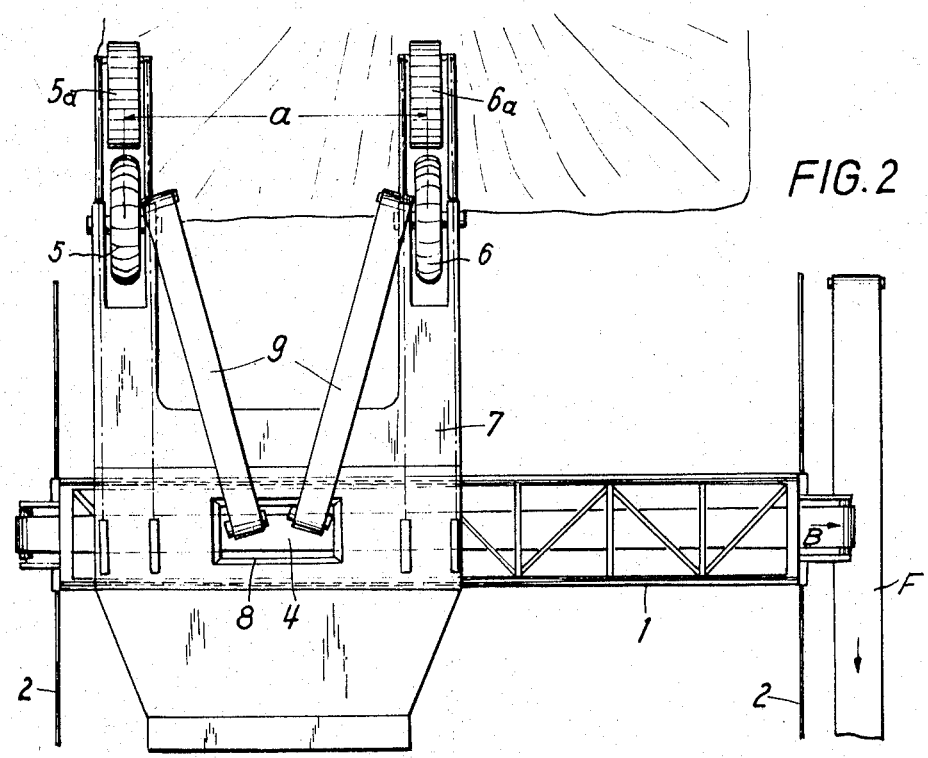
FIG. 2 is a top view of the arrangement of FIG. 1.
Figure 3:
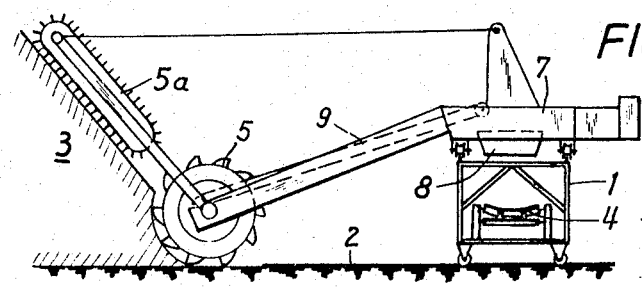
FIG. 3 is a side view of FIG. 1 as seen in the direction of the arrow A.

The arrangement according to the invention as illustrated in FIGS. 1 to 3 is furthermore provided with two feeder belts 9 which when seen from the top are arranged in V-formation. More specifically, one end portion of each of said feeder belts 9 is adjacent the respective bucket wheels 5 and 6 so as to receive the material picked up by the same, whereas the other end portion of said feeder belts 9 converge at the transfer station 8 so as to unload material from said feeder belts 9 through said transfer station or opening 8 onto conveyor belt 4.

In the particular position of boom 7 as illustrated in FIGS. 1 and 2, bucket wheel 5 is at the left-hand end of the foot of the slope of pile 3 where it picks up no material or only a very minor quantity. On the other hand, bucket wheel 6 will at this time be located approximately at the center of the foot of the slope of pile 3 where the pile is highest. Consequently, scrapers 6a will feed a maximum of material to bucket wheel 6 so that the latter at this time picks up a maximum quantity of material. To the extent to which boom 7 moves toward the right, bucket wheel 5 moves into the range of ever increasing height of the slope of pile 3 so that scraper 5a will feed more and more material per time unit to bucket wheel 5. On the other hand, during this movement, bucket wheel 6 moves into an area of ever decreasing height of pile 3 so that its scraper 6a will feed less and less material per time unit to bucket wheel 6. Inasmuch as the profile of pile 3 is an isosceles triangle while the distance a of the two bucket wheels 5 and 6 from each other equals half the width of base b of said triangle, it will be appreciated that the total of the quantity of material picked up by the two bucket wheels 5 and 6 per time unit will remain substantially the same. Since furthermore the quantity of the feeder belts 9 and their feeding velocity equal each other, also the total of the conveyed quantities unloaded per time unit through opening 8 onto conveyor belt 4 will in all positions of the bucket wheels 5, 6 or boom 7 with regard to girder 1 remain the same. The bridge conveyor belt 4 and the subsequent removing conveyor belt F will, therefore, during the entire removing operation not be affected by the continuous back and forth movement of the two bucket wheels 5 and 6 along the slope of the pile but the said bridge conveyor belt 4 will always be loaded uniformly. This is of great economic advantage in connection with the operation of such device.

While the arrangement of FIGS. 1 and 2 is provided with two bucket wheels only, it is also possible according to the present invention to provide the device with more than two, for instance three bucket wheels. Such an arrangement is shown in FIGS. 4 and 5 in which the parts corresponding to those of FIGS. 1 and 2 have been designated with the same reference numerals, the additional bucket wheel in FIGS. 4 and 5 being designated with the reference numeral 10a. The boom movable on girder 1 and carrying the bucket wheels 5a, 6a and 10a is designated with the reference numeral 7a. The operation of the arrangement of FIGS. 4 and 5 corresponds to that of FIGS. 1 and 2.

It is, of course, to be understood that the present invention is, by no means, limited to the particular arrangements shown in the drawings but also comprises any modifications within the scope of the appended claims. Thus, the slope of the pile to be taken down does not necessarily have to have a triangular profile but may also have another profile, for instance a trapezoidal profile. In this instance it is merely necessary that at least those bucket wheels which cooperate with the lateral slopes of the pile, through the intervention of feeder belts arranged in V-formation and having the same length, cooperate with a transfer station which moves together with the bucket wheels and moves above the girder conveyor belt 4. Between these bucket wheels one or more bucket wheels may be arranged which take down the intermediate portion of the pile with horizontal top side. Such an operation is possible with the arrangement of FIGS. 4 and 5.

What I claim is:

1. A device for picking up and unloading pourable material from a pile of pourable material, which includes: girder means, first conveyor means extending in the longitudinal direction of said girder means and being supported by said girder means, carriage means supporting said girder means and operable to move said girder means with said conveyor means in a direction transverse to the longitudinal direction of said girder means toward and away from a pile of pourable material to be picked up, boom means supported by said girder means and movable thereon in the longitudinal direction of said girder means, said boom means extending substantially perpendicularly with regard to the longitudinal direction of said girder means, a plurality of pick-up means supported by said boom means for picking up material from a pile of pourable material, said pick-up means being spaced from each other in the longitudinal direction of said girder means, and a plurality of additional conveyor means respectively having one end portion thereof arranged adjacent said pick-up means whereas the other end portions of said additional conveyor means converge toward each other and are arranged above said first conveyor means for conveying thereto material picked up by said pick-up means.

2. A device according to claim 1, in which said additional conveyor means have substantially the same conveying length.

3. A device according to claim 1, in which said boom means has an opening above said first conveyor means, and in which said conveying end portions of said additional conveyor means lead into said opening.

4. A device according to claim 1, in which said boom means carries two pick-up means spaced from each other by a distance equalling substantially half the width of the pile of material to be picked up at the base of said pile.

5. A device according to claim 1, in which said boom means is equipped with three evenly spaced pick-up means.

No references cited.

EVON C. BLUNK, *Primary Examiner.*

M. L. AJEMAN, *Assistant Examiner.*